United States Patent
Endres et al.

(10) Patent No.: US 9,919,786 B2
(45) Date of Patent: Mar. 20, 2018

(54) ACOUSTIC CABIN PANEL

(71) Applicants: Airbus Defence and Space GmbH, Taufkirchen (DE); Airbus Operations GmbH, Hamburg (DE)

(72) Inventors: Christian Gregor Endres, Pfaffenhofen (DE); Hans-Jürgen Weber, Hamburg (DE)

(73) Assignees: AIRBUS DEFENCE AND SPACE GMBH, Taufkirchen (DE); AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/105,514

(22) PCT Filed: Dec. 17, 2014

(86) PCT No.: PCT/EP2014/078271
§ 371 (c)(1),
(2) Date: Jun. 16, 2016

(87) PCT Pub. No.: WO2015/091674
PCT Pub. Date: Jun. 25, 2015

(65) Prior Publication Data
US 2016/0311513 A1    Oct. 27, 2016

(30) Foreign Application Priority Data
Dec. 17, 2013 (DE) .................. 10 2013 114 253

(51) Int. Cl.
E04B 1/82    (2006.01)
B64C 1/06    (2006.01)
(Continued)

(52) U.S. Cl.
CPC ............... *B64C 1/066* (2013.01); *B29C 70/08* (2013.01); *B29C 70/086* (2013.01); *B29C 70/24* (2013.01);
(Continued)

(58) Field of Classification Search
CPC ...................................... B64C 1/066
(Continued)

(56) References Cited

U.S. PATENT DOCUMENTS 5,975,237 A * 11/1999 Welch .................... B64D 33/06
181/213
6,291,049 B1    9/2001 Kunkel et al.
(Continued)

FOREIGN PATENT DOCUMENTS

DE    102005024408 A1    11/2006

OTHER PUBLICATIONS

International Searching Authority, International Search Report for International Patent Application No. PCT/EP2014/078271 dated Mar. 11, 2015.

*Primary Examiner* — Forrest M Phillips
(74) *Attorney, Agent, or Firm* — Lorenz & Kopf, LLP

(57) ABSTRACT

The present invention relates to acoustical panels. As to provide a cabin panel to be made as simple as possible and with optimized acoustical properties, an acoustical cabin panel (10) is provided that comprises a first (12) and a second layer (14) which are spaced apart from each other by an intermediate layer (16) and altogether with a plurality of reinforcement elements (22) form a core composite component (24). Furthermore, the panel comprises at least one intermediate layer (18) made of a core material (20) which is arranged in the intermediate layer. The reinforcement elements extend from the first to the second layer through the at least one intermediate film and are tension and
(Continued)

pressure resilient in a finished state of the panel. The reinforcement elements can be at least partially infiltrated with a curable matrix material and at least one prepreg (26) soaked with matrix material is provided in the first and/or second layer. Thereby, the reinforcement elements to be infiltrated with matrix material are connected to the prepreg.

14 Claims, 4 Drawing Sheets

(51) Int. Cl.
| | | |
|---|---|---|
| | *B29C 70/08* | (2006.01) |
| | *B29C 70/24* | (2006.01) |
| | *B29C 70/42* | (2006.01) |
| | *G10K 11/168* | (2006.01) |
| | *B29L 31/30* | (2006.01) |
| | *B29K 683/00* | (2006.01) |

(52) U.S. Cl.
CPC ............ B29C 70/42 (2013.01); G10K 11/168 (2013.01); *B29K 2683/00* (2013.01); *B29K 2715/003* (2013.01); *B29K 2995/0002* (2013.01); *B29L 2031/3041* (2013.01); *B29L 2031/3076* (2013.01); *B29L 2031/3082* (2013.01); *Y02T 50/433* (2013.01); *Y02T 50/46* (2013.01)

(58) Field of Classification Search
USPC .......................................................... 181/290
See application file for complete search history.

(56) References Cited

U.S. PATENT DOCUMENTS

| | | | | |
|---|---|---|---|---|
| 8,979,014 | B2* | 3/2015 | Boock | B32B 3/12 |
| | | | | 181/286 |
| 2008/0277057 | A1* | 11/2008 | Montgomery | B32B 5/26 |
| | | | | 156/307.1 |
| 2009/0250293 | A1* | 10/2009 | Gleine | B60R 13/0815 |
| | | | | 181/292 |
| 2010/0101891 | A1* | 4/2010 | Kamikawa | B32B 15/14 |
| | | | | 181/290 |
| 2010/0148001 | A1 | 6/2010 | Hoetzeldt et al. | |
| 2010/0151189 | A1 | 6/2010 | Chakrabarti | |
| 2010/0170746 | A1* | 7/2010 | Restuccia | B29C 70/083 |
| | | | | 181/290 |
| 2013/0037346 | A1* | 2/2013 | Pachale | B32B 3/12 |
| | | | | 181/290 |
| 2013/0266765 | A1 | 10/2013 | Dolzinski et al. | |

* cited by examiner

ACOUSTIC CABIN PANEL

CROSS-REFERENCE TO RELATED APPLICATION

This is a continuation of International Application No. PCT/EP2014/078271, filed Dec. 17, 2014, which application claims priority to German Application No. 10 2013 114 253.2, filed Dec. 17, 2013, which are hereby incorporated by reference in their entirety.

TECHNICAL FIELD

The embodiments described herein relate to a panel with an acoustically and mechanically optimized core composite, and relates in particular to an acoustical cabin panel, an aircraft, a method for manufacturing an acoustical cabin panel and a use of an acoustical cabin panel in a vehicle.

BACKGROUND

In addition, other objects, desirable features and characteristics will become apparent from the subsequent summary and detailed description, and the appended claims, taken in conjunction with the accompanying drawings and this background.

Cabin areas, for example in an aircraft or other vehicles, are often designed with an interior trim paneling or interior lining which are located in front of a supporting structure, for example. For example, the trim paneling comprises a plurality of cabin panels. In addition to the purpose of limiting the cabin area cabin panels can also be used to improve the acoustic room characteristics. For example, cabin panels with acoustical dampening structures are designed, e.g. sandwich constructions with a honeycomb core plate as the core layer and acoustical dampening surface layers. However, it has become evident that the honeycomb core structures must be converted in a complex manner for adapting to the different room types, which in turn will also have an effect on the acoustical properties. In the document DE 10 2005 024408 A1 the reinforcement of foam materials is described. A rigid foam is placed between two surface layers which can be fastened to each other by implementation of a sewing method. The fiber bundles used for sewing and stitching are filled with a matrix material, for example the fiber bundles are infiltrated with a resin. However, it has become evident that the infiltration with resin is costly.

SUMMARY

There may therefore be a need for providing a simply to manufacture cabin panel with optimized acoustical properties.

This need is addressed by an acoustical cabin panel, an aircraft, a method and use according to the independent claims. Exemplary embodiments are described in the dependent claims and the following description. It should be noted that the described features of the embodiments of the devices also apply for embodiments of the method as well as use of the device and vice versa. Even those features can be combined freely with each other, where this is not explicitly mentioned.

An acoustical cabin panel is provided which comprises a first and a second layer that are spaced apart from each other by an intermediate layer and together with a plurality of reinforcement elements form a core composite component. There is also provided at least one intermediate sublayer made of a core material wherein the intermediate sublayer is located within the intermediate layer. The reinforcement elements extend from the first to the second layer through the at least one intermediate sublayer and are in the finished state of the panel resilient to tension and pressure. The reinforcement elements can be at least partially infiltrated with a hardenable or curable matrix material. At least one prepreg (short for preimpregnated fiber) soaked with matrix material is provided in the first and/or second layer. The reinforcement elements for being infiltrated with matrix material are in connection with the prepreg.

The infiltration of the reinforcement elements is simplified through the provision of prepregs and the connection of the reinforcement elements with the prepreg. The prepreg enables a simple introduction of matrix material in the construction, since the prepreg is provided or inserted during the consolidation of the layers for the core composite component, so that further, in particular more specific steps to infiltrate the matrix material can be omitted. The matrix material can be soaked by the reinforcement elements or it can flow from the prepreg to the reinforcement element as a result of the connection of the reinforcement elements with the prepreg.

The term "prepreg" defines at least one layer or sublayer made of a fiber composite material which comprises high-performance fibers such as carbon fibers, aramid fibers etc., and which is soaked or provided at least partially with a matrix material or a binder material which can be hardened or cured, or in a finished state of the panel has already been cured. The matrix material can be fluid and the fibers can be impregnated with it. The matrix material can also be viscous or as (sticky) powder available before it is cured.

In addition to the use of high-performance fibers for a prepreg provision is made for using different fiber material or tissue material as a transport medium for the matrix material.

In one example, at least the first or the second layer comprises an additional prepreg. In another example at least the first or the second layer is a prepreg. In a further example provision is made for a prepreg in the first and second layer.

The term "reinforcement element" refers to structurally acting components or elements within the component which contribute to a reinforcement of the component, i.e. reinforce the component in the sense of reinforcement for the improvement of the statics, i.e. load bearing properties. The reinforcement elements can be provided as separate elements or integral with other elements, components, areas, etc.

The term "core composite component" refers to a flat component having a multi-layered structure with at least a first and a second layer, between which a core sublayer (also referred to as the core layer) is located. The core sublayer is used to hold the two layers spaced apart from each other. This allows the two layers, i.e. the two outer layers which are spaced apart by the core, to have different static functions in case of a force acting perpendicular to the surface. For example, in case of a force acting as a pressure force the layer facing the force, i.e. the closer layer, forms a pressurized area, whereas the layer opposite of the force, i.e. the remote layer forms a tensile loaded zone. For provision of the static functions, the intermediate layer must have a certain thickness.

The acoustical cabin panel is at least so bend-proof that it self-supporting. The acoustical cabin panel, for example, is not deformable, after the first and the second layer, as well as the intermediate layer with the intermediate sublayer, with the reinforcement elements are connected to each other, after the matrix material in the reinforcement elements is cured.

In the finished state of the panel the reinforcement elements are tension and pressure resilient, whereby the term "finished state" refers to the built-in or mounted state of the panel, and also the status during the handling if the matrix material is cured. The tensile strength is already provided by the reinforcement elements themselves at least to a not insignificant proportion. The pressure resilience is particularly in thread elements provided for the most part by the matrix material if this is cured.

By providing the intermediate sublayer, in particular by providing the core material, the acoustical properties of the panel are ensured. The mechanical properties are characterized by the core composite.

For example, the intermediate sublayer is connected with the adjacent layers via the surface such that the connection is resistant against shear forces, e.g. glued on and/or connected or linked by several reinforcement elements.

The reinforcement elements are rigidly connected with the adjacent layers, for example.

The material of the intermediate layer is also referred to as core material.

In one example, the first and the second layer as a surface layers and are formed with the intermediate layer as a sandwich construction.

In one example the panel is self-supporting as a result of the core composite effect of the intermediate sublayer together with the reinforcement elements.

The term "self-supporting" refers to the fact that the panel, i.e. the acoustical cabin panel, is able to bear the net weight. The term "self-supporting" refers also to the fact that the panel maintains its shape and contour after curing the matrix material of the reinforcement elements and during the further handling, such as mounting or final processing.

In one example, the reinforcement elements for being infiltrated with matrix material are in such connection with the prepreg that matrix material from the prepreg gets to the reinforcement elements or already got there, e.g. when heating the device so that the matrix material becomes liquid and the reinforcement elements are infiltrated, e.g. by capillary effect.

The infiltration of the reinforcement elements with the matrix material can also be caused by a vacuum process, or also in combination with capillary effect and pressure differences, or vacuum.

The connection can also be used as a communicating connection.

In one example, the reinforcement elements are infiltrated with the curable matrix material, e.g. before inserting the reinforcement elements.

In accordance with an example it is planned that for example on a surface of approx. 16×16 mm², one to two reinforcement elements are provided. In another example even more reinforcement elements are provided on a corresponding surface, and in another example the same number of reinforcement elements is arranged on a larger area.

For example, the reinforcement elements have a diameter in the range of approx. 0.1 mm to approx. 5 mm, e.g. a diameter of 0.5 mm to 1.5 mm.

In a further example provision is made for several layers of a core composite being provided for the improvement of the dampening properties and for increasing the mechanical stability at the same time.

In another example the acoustical cabin panel is bend-proof to such an extent that it is self-supporting even before the curing of the reinforcement elements, or before the curing of the matrix material of infiltrated reinforcement elements.

The term "self-supporting" refers in accordance with an example also to the fact that the panel maintains its shape and contour before the curing of the matrix material of the reinforcement elements for the further handling.

The term "at least one intermediate sublayer made of a core material" includes the forming of exactly one intermediate sublayer. The term also includes two intermediate sublayers, three intermediate sublayers, four intermediate sublayers, five intermediate sublayers, six intermediate sublayers, seven intermediate sublayers, eight intermediate sublayers, nine intermediate sublayers or even ten intermediate sublayers. The term also includes more than ten intermediate sublayers, e.g. fifteen intermediate sublayers or more.

In accordance with an example the intermediate sublayer comprises a material which is elastically compressible and has a low flexural strength or flexural rigidity.

Thus, a further improved acoustical characteristic for noise reduction in the sense of improving the acoustical situation in the cabin is provided.

The term "elastic compressible" is to be understood for example as the property that the material is at least one tenth of the slice thickness elastically compressible, i.e. can be compressed and then takes again approximately the same slice thickness it had before the compression. For example, the material is elastically compressible around $1/5$, $1/4$, $1/3$ or half, or more.

Under "low stiffness" for instance a material is to be understood which has a low E-module, i.e. a low modulus of elasticity, for example with a value of less than 0.5 Giga Pascal, for example less than 0.1 Giga Pascal. In one example there is an E-module from 0.01 to 0.1 Giga Pascal. In any case, the E-module is so low that it is a value below 1.

For example, the intermediate sublayer is made of a foam material. In one example, the core material is elastically compressible.

In an example the at least one intermediate sublayer made of the compressible core material forms a primary intermediate sublayer, and a secondary intermediate layer is provided which is made of a non-compressible material, or made of a material that is clearly less elastic compressible, e.g. the elastic compressibility is to half less. In another example an elastic compressibility is provided with a difference of 3:1 or 4:1 or 5:1 or 10:1 or an even larger ratio related to the different intermediate sublayers of the intermediate layer.

For example, there can be provided several intermediate sublayers made of the compressible material. Furthermore, even one or more intermediate sublayers made of the non-compressible material may be provided.

The foam material can be a bend-proof plate material. The foam material can be adapted to a three-dimensional shape. The foam material can also be provided as softly bending and e.g. elastic plate material which can be adapted to different shapes.

The core material may be unsorted or uneven fiber or a fabric, as long as the compressibility is given. The term "compressible" refers to material which, under the effect of a perpendicular force acting to the surface, is compressible to more than approximately 20%, for example, 30%, 40% or 50% of the thickness.

In accordance with an example, the core material is a silicone foam rubber.

For example, the core material is provided as a silicone foam, e.g. between two top skins, of which at least one is arranged as a CFK-top skin (carbon fiber composite material).

In a further example the reinforcement elements are connected with the first and second layer.

The term "connected" refers to a connection of the reinforcement elements with the first and/or second shift, where a transfer of power between the first and second layer and the reinforcement element is given, wherein particularly tensile and compressive forces can be transferred. The connection can also be referred to as a force transmitting connection. Depending on the design of the first and second layer a moment can also be transferred, for example a bending moment, i.e. the reinforcement elements can be fastened overhanging in the first and/or second layer. The force transmitting connection of the reinforcement elements with the layers leads to a core composite component with improved static properties being provided, while at the same time optimizing the acoustical properties.

In accordance with an example the reinforcement elements are bend-proof and connected with the first and the second core layer.

The reinforcement elements are bend-proof in the finished, e.g. cured state.

In a further example the reinforcement elements are already bend-proof when assembling the core composite component.

The reinforcement elements are designed as bend-proof linear elements that extend in the direction of the thickness of the intermediate layer.

The reinforcement elements are pins, rods or ribs plugged or stuck through the core layer, i.e. the intermediate layer or the layers. The connection with the individual sublayers/layers can be for example by gluing.

In a further example the reinforcement elements are connected with other layers and extend over the entire thickness of the panel and connect the layers to each other.

In a further example the reinforcement elements are bend-proof, e.g. on at least half of the thickness of the intermediate layer. Preferably, the reinforcement elements are bend-proof over the entire thickness of the intermediate layer.

In another example, the reinforcement elements extend over one intermediate layer each, where several intermediate layers are provided. The reinforcement elements can be positioned offset or aligned to each other, for example in each of the individual intermediate layers in the direction of the thickness of the panel.

According to an example the reinforcement elements are designed as thread elements and the thread elements can be infiltrated with the curable matrix material, or have already been infiltrated with the matrix material.

The thread elements form a suturing and form the reinforcement with the soaked cured matrix material, which connects the intermediate sublayer at least with the two adjacent layers, so that a core composite component is formed by the layers together with the intermediate sublayer.

The thread elements can be soaked or impregnated with matrix material.

The thread elements can be made of a plurality of fibers, e.g. fiber bundles.

The reinforcement elements can be used as a connection between the intermediate sublayer and the adjacent layers.

The reinforcement elements can be arranged perpendicular to the surface of the intermediate layer or can extend inclined thereto. The reinforcement elements may be straight, curved or polygonal.

The term "thread elements" refers for example to twisted monofilament, e.g. monofilament of a fiber material, for which also the term "thread" or "threads" will be used. The term "thread elements" also refers to non-twisted monofilament, e.g. stretched monofilaments. With "thread elements" thin, flexible linear elements are referred to that may be made up of several individual fibers or even may comprise just a single fiber. The flexibility here refers to a direction perpendicular to the longitudinal direction and not to a flexibility in a linear direction. The cross-section of the thread elements is for example round, square or amorphous.

The thread elements form a suturing and form the reinforcement with the soaked cured matrix material, which connects the intermediate sublayer with the adjacent layers, so that a core composite component is formed by the first and second layers together with the intermediate layer.

The thread elements may be soaked or impregnated with matrix material, or may be infiltrated even after the introduction of the thread elements. The thread elements can be made of a plurality of fibers, e.g. fiber bundles.

The infiltration, or soaking, or impregnation at least happens partly through the connection with the at least one prepreg. In addition to the "supply" with the matrix material from the prepreg the thread elements or the reinforcement elements can also be additionally impregnated or soaked.

As already mentioned, the reinforcement elements can be inclined with reference to the surface of the acoustical cabin panel or even perpendicular to it. The perpendicular and inclined arrangement can also be combined. The reinforcement elements may be straight, curved or polygonal, as already mentioned, wherein a linear characteristic may be beneficial for forming the core composite effect.

The reinforcement elements can be made of metal, polymer or ceramic. The reinforcement elements can also be formed as composite components, e.g. fiber reinforced composite components of a high-performance fiber with a matrix material. For example, metal pins or ceramic pins, or pins made of carbon fiber composite plastic material can be provided.

In accordance with an example the reinforcement elements are inclined with reference to a direction of the layer and layer thickness of the acoustical cabin panel.

With the term "inclined" a direction is defined which is different from the normal or perpendicular direction, wherein "normal" refers to a range of approximately 90° to the longitudinal direction or extension direction of the cabin panel. For example, the layer thickness is the shortest connection line between the two outer surfaces in case of a curved cabin panel section. The term "layer direction" is to be understood as the direction of the layer, or of the first layer, the second layer or the intermediate layer in the longitudinal direction of the cabin panel. The term "inclined" refers to a direction that deviates by at least approx. 10° from the respective reference direction. "Inclined to the layer thickness" for example describes an extension that deviates at least 10° from the direction of the layer thickness. The term "angle" for instance is to be understood as a deviation of at least 30°, or at least 45°.

In accordance with an example a blocking treatment is applied to the intermediate layer at least in the area of the reinforcement elements, wherein the blocking treatment prevents intrusion of matrix material during infiltration of the reinforcement elements.

The blocking treatment is a coating, for example. The blocking treatment is a rubber matrix, for example.

In accordance with an example the first and the second layer are made of fiber-reinforced plastics and/or of a metal material.

An aircraft is provided which comprises at least one cabin area arranged in a fuselage construction. The cabin area includes an interior trim comprising panels. At least some of the panels is formed as acoustical cabin panels according to any of the preceding examples and embodiments.

As a result, and with reference to the passenger comfort inside the cabin area, an improved acoustics is provided, as the acoustical cabin panels have an elasticity due to the intermediate layer being made of foam material and with reference to the transverse direction of the surface, and thus enable in particular a reduced sound transmission and also has an improved damping or absorption effect, especially for low frequency sound fields. Due to the core composite, i.e. the core composite effect as a result of the reinforcement elements, the acoustical cabin panels are also sufficiently stable in mechanical terms as to be used as interior trim.

A method for manufacturing of an acoustical cabin panel is provided. The method comprises the following steps:

In a first step an intermediate layer is arranged between a first and a second layer, wherein the first and the second layer are spaced apart by the intermediate layer. The intermediate layer comprises at least one intermediate sublayer made of a core material that is arranged in the intermediate layer. Furthermore, there is also provided a prepreg soaked with matrix material in at least one of the first and second layers.

In a second step, a plurality of reinforcement elements is positioned, which extend from the first to the second layer through the at least one intermediate sublayer and which are tension and pressure resilient in the finished state of the panel.

In a third step at least a part of the reinforcement elements is infiltrated with a curable matrix material. The first layer, the intermediate layer and the second layer, together with the reinforcement elements form a core composite component.

In accordance with an example the reinforcement elements are designed as thread elements and there is a fourth step in which the matrix material is cured.

In accordance with a further example provision is made for adjusting to a form or a contour prior to the curing of the matrix material.

In accordance with a further example it is envisaged that the matrix material before complete curing is only partly cured and the matrix material is then in a B-Stage condition in which a part of the matrix material is cured and a part is not cured yet. Adapting to a form or a contour is envisaged thereafter only.

The plate material is first in the B-stage state and is provided for example in a planar shape as a plate or semi-finished products. Although the material is already partially cured, the material can nevertheless be formed well after heating. Thus, plate material, for example, can be manufactured cheaply and the reshaping is easy to integrate in subsequent work processes and can also be executed relatively fast.

For example, this is additionally supported by a resilient core, e.g. in the case of an elastic foam material for the core.

In accordance with an example the arrangement of the reinforcement elements takes place prior to shaping.

In accordance with an example it is envisaged that the prepreg soaked with matrix material is provided in only one of the first and second layers, or top sublayer. Shaping is then performed prior to the application of a prepreg soaked with matrix material in the other one of the first and second layers. Only then the prepreg soaked with matrix material is applied to the other layer or top sublayer.

Thereby, the reshaping will be further facilitated and a way to improve the surface quality is provided.

For example, the application of the prepreg (top) sublayers takes place in two steps: first, a prepreg is one-sided applied to a flat plate. By creating a vacuum on the opposite side, for example, air is sucked from the reinforcement elements, e.g. if at the same time resin material, i.e. matrix material, is sucked. In a further step of the production of the plate material the other side is applied with a prepreg sublayer.

Use of an acoustical cabin panel according to one of the above mentioned examples in a vehicle is envisaged.

As vehicles, particularly civil vehicles, such as passenger cars, money transporters, buses, minibuses are to be understood, as well as military vehicles. As vehicles, even rail-bound vehicles are to be understood. As vehicles, especially aircraft are to be understood, e.g., airplanes and helicopters.

In accordance with an aspect a panel is provided which is structured as a sandwich construction. In the core composite a core layer is provided in form of a layer which as such has only moderate to no mechanical properties, and actually alone would not be able to meet the load-bearing function of the core composite. However, as a structural reinforcement is provided, the core layer is influenced in its mechanical properties so that the load-bearing function of the core composite structure is guaranteed. In the composite a suturing with the top sublayers and a subsequent infiltration with matrix material takes place. If the stitches density is not too high, the core sublayer, for example a silicone foam, can have an acoustically dampening effect and the reinforcements are mechanically supporting. The higher the stitches density is provided, the more dominant is the stiffening effect, so that the total amount of the composite and the stitch density the properties of the composite can be determined, in respect of a trade-off between the mechanical stability and the acoustical damping. For example, a none or only little loaded trim component, e.g. in the ceiling area of a cabin trim, may have a lower stitches density, so that in this way the external noise can be attenuated more, and so a more comfortable cabin ambience with reference to the acoustics can be provided for the user, i.e. for example the passenger or crew. It is intended, on the one hand, that a core material is used which is very elastic or soft and thus enables optimum acoustical properties or damping. Vibrations cannot be transferred by the soft material but will be transformed to heat energy in the material and thus absorbed. As soft materials in turn have bad to no mechanical properties, a connection in the form of the reinforcement elements is provided to give the component a certain amount of mechanical strength that the core material, for example a silicone foam rubber, does not have. In addition to the elasticity of the core layer for the acoustical properties the elasticity allows a simplified shaping, for example before curing of the reinforcement elements. This allows providing panels which can be processed better and in particular also require less finishing work, and also cost less than for example honeycomb cores which must be crashed, for example, for the shaping or adaptation to space profiles. The provision of a (too) soft core material allows for acoustical damping on the one side and the usually required honeycomb material can be omitted on the other side, which results in weight and space savings. By the inventive provision of a prepreg material which is connected to the reinforcement elements, a substantial simplification during the manufacturing process and also an improvement of the mechanical properties is ensured, without, however, affecting the acoustical damping properties.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
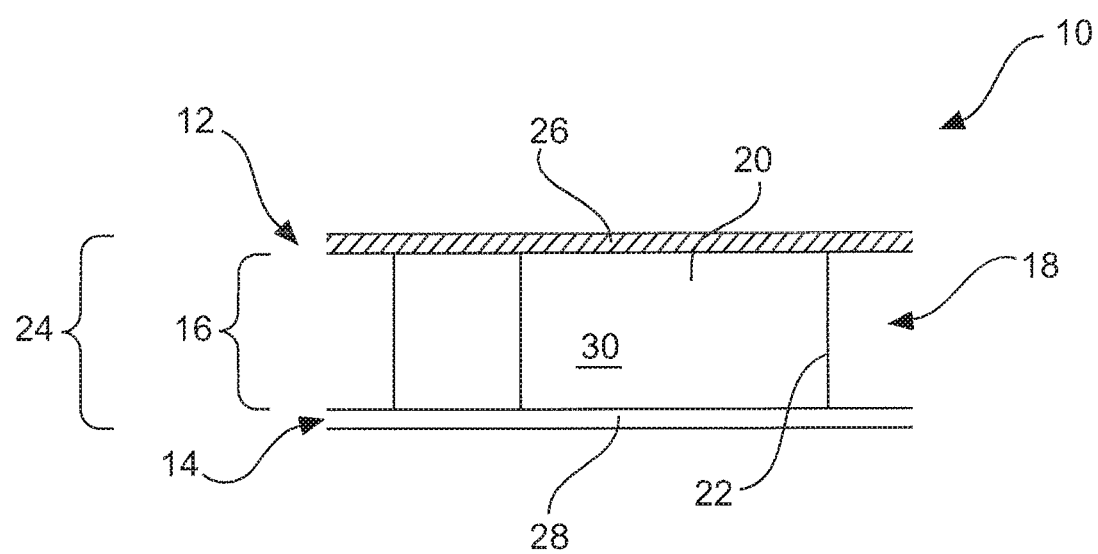
FIG. 1 is a cross-section through an example of an acoustical cabin panel.

FIG. 1 shows an acoustical cabin panel 10 which comprises a first layer 12 and a second layer 14, with an intermediate layer 16 provided in between 16, by which intermediate layer the first and the second layer 12, 14 are spaced apart from each other. At least one intermediate sublayer 18 made of core material 20 is provided in the intermediate layer 16.

The first and the second layer 12, 14, form together with a plurality of reinforcement elements 22 a core composite component 24. The reinforcement elements 22 are tension resilient and pressure resilient and extend from the first layer 12 to the second layer 14 through the at least one intermediate sublayer 18. The reinforcement elements can be at least partially infiltrated with a curable matrix material (not shown). Therefore, at least one prepreg 26 soaked with matrix material (in FIG. 1 indicated by a hatching) is provided in the first and/or second layer. The reinforcement elements 22 to be infiltrated with matrix material are connected to the prepreg 26.

The first layer 12 can also be referred to as the first top layer, while the second layer 14 can be referred to as a second top layer.

In FIG. 1 the first layer 12 is shown as the prepreg 26 soaked with matrix material and the second layer 14 is shown as a different layer 28, which is indicated with a different cross sectional view is. In a further example which is not shown both the first and the second layer 12, 14 are formed as prepreg.

In accordance with an example the intermediate sublayer 18 is made of a material which is elastically compressible and which is of a low rigidity. For example, the intermediate sublayer has a low E-module, for example to a value lower than 1 Giga Pascal, for example in a range of 0.1 to 0.01 Giga Pascal. For example, the intermediate sublayer 18 consists of a foam material 30, for example from a silicone foam rubber.

Figure 2A:
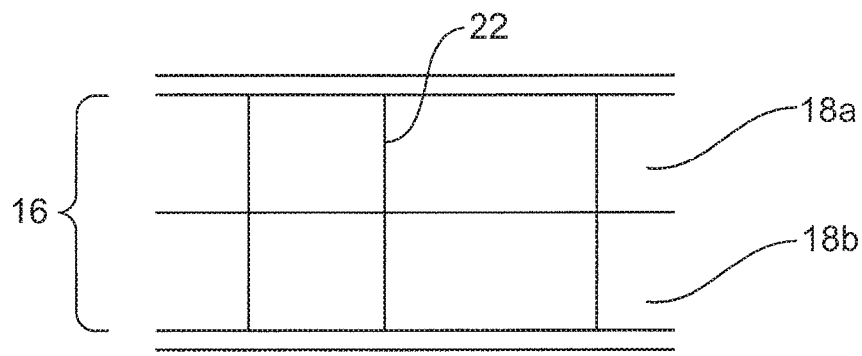
FIG. 2A is another example of an acoustical cabin panel in the cross-section.

FIG. 2A shows another example where the intermediate layer 16 is formed of two intermediate sublayers 18a, 18b. The two intermediate sublayers 18a, 18b both may be made of the same core material or with different core materials. For example, the reinforcement elements 22 extend through both intermediate sublayers 18a, 18b.

For example, one of the two intermediate sublayers comprises the elastically compressible material having a low rigidity and the other of the two intermediate sublayers comprises a different material, such as a more rigid material.

The reinforcement elements 22 are shown with a single line in the figures. The reinforcement elements 22 can be different, in particular having different cross-sections and diameters. For example, the reinforcement elements 22 have a diameter in the range of approx. 0.1 mm up to approx. 5 mm, e.g. a diameter of 0.5 mm to 1.5 mm.

Figure 2B:
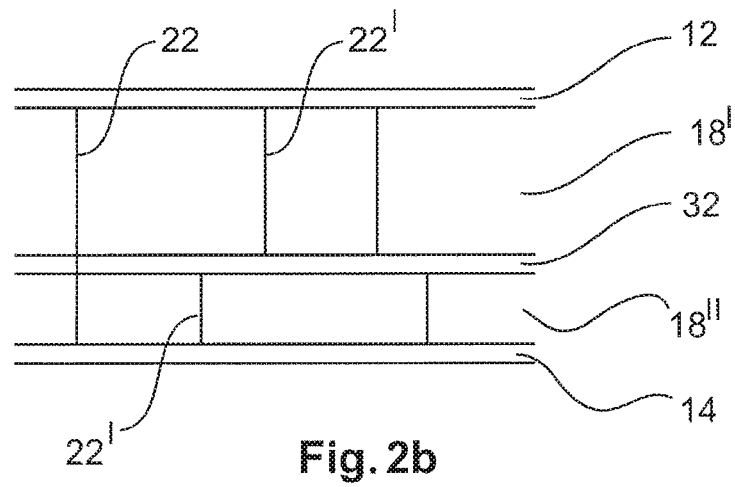
FIG. 2B is a further example of an acoustical cabin panel with several intermediate layers.

In FIG. 2B an embodiment is shown in which a first intermediate layer 18' is positioned between the first layer 12 and a further layer 32, which forms a second layer when referring to the intermediate sublayer 18' a forms a first layer when referring to a further intermediate sublayer 18". On the opposite side is yet another, outer layer arranged that acts as the second layer 14 for the further intermediate sublayer 18". The reinforcement elements 22 can be arranged continuously, i.e. from the one outer layer to the opposite second outer layer, or can be arranged offset, as indicated by reference signs 22'.

Figure 2C:
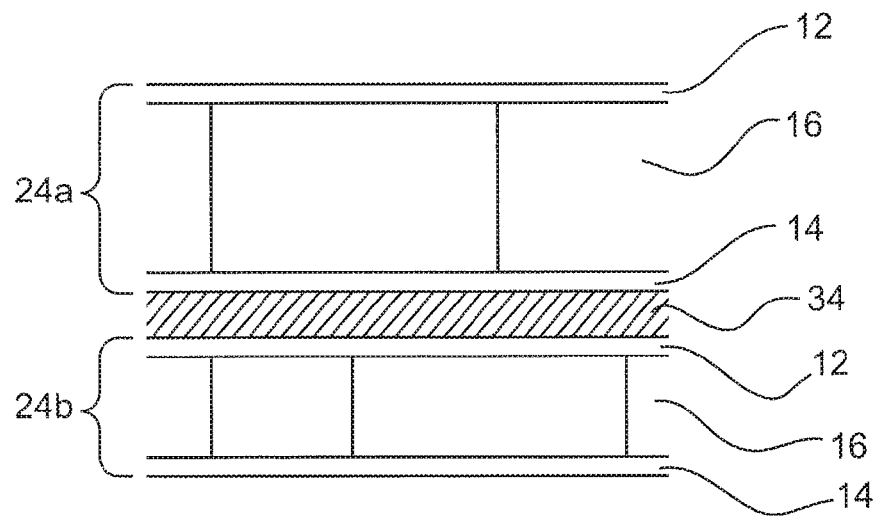
FIG. 2C is another example of an acoustical cabin panel with several core composite structures.

FIG. 2C shows a further embodiment in which a first core composite 24a and a second core composite 24b are provided together with the respective first and second layers 12, 14 and an intermediate layer 16 arranged in between. Between the two core components 24a, 24b a further layer 34 is provided, for example with a supporting structure or as further dampening structure depending on the requirement profile.

In accordance with a further example it is provided that the reinforcement elements are bend-proof and connected to the first and the second layer.

The reinforcement elements 22 can be perpendicular to the slice direction, i.e. parallel to the slice thickness as indicated in the FIGS. 1, 2A, 2B and 2C.

Figure 3:
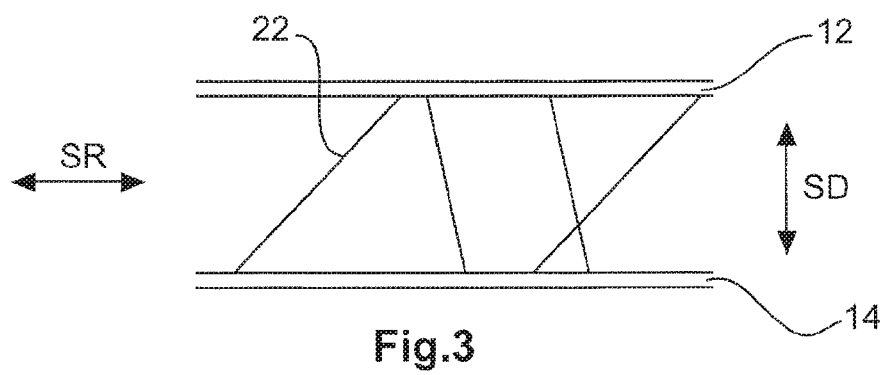
FIG. 3 is a cross-section of a cabin panel in an example with inclined reinforcement elements.

In FIG. 3 is an embodiment is shown in which the reinforcement elements 22 are inclined, e.g. to a layer direction $S_R$ and a layer thickness $S_D$.

Figure 4:
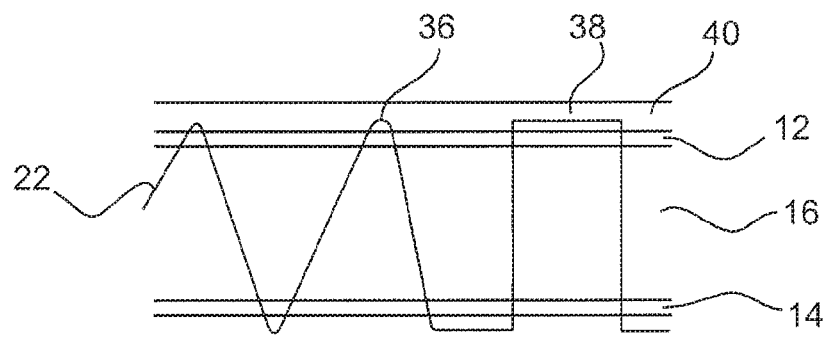
FIG. 4 is another example of an acoustical cabin panel with a reinforcement elements formed as sewing.

FIG. 4 shows an example in which the reinforcement elements 22 are formed as sewing and establish the connection between the reinforcement elements 22 and the first and second layer 12, 14 in a loop-like manner, as indicated by reference sign 36. The sewing can be provided for example as a diagonally extending zigzag pattern, or can be provided perpendicularly extending with the straps then being formed as a kind of bridging segments 38.

In accordance with a further example shown as an option in FIG. 4, an additional layer can be provided on at least one of the two outer surfaces of the first or second layer 12, 14, the additional layer being for example a protective layer against UV radiation or other influences, or also as a further layer to influence the acoustical properties, e.g. as a diffuser. The additional layer 40 may also be the optical completion of a cabin panel facing the passenger cabin.

As already mentioned, in accordance with a further example the reinforcement elements 22 can be formed as thread elements which can be infiltrated with the curable matrix material.

In accordance with a (not further shown) embodiment a blocking treatment of the intermediate sublayer is provided at least in the area of the reinforcement elements as to prevent an intrusion of matrix material into the intermediate sublayer.

Figure 5:
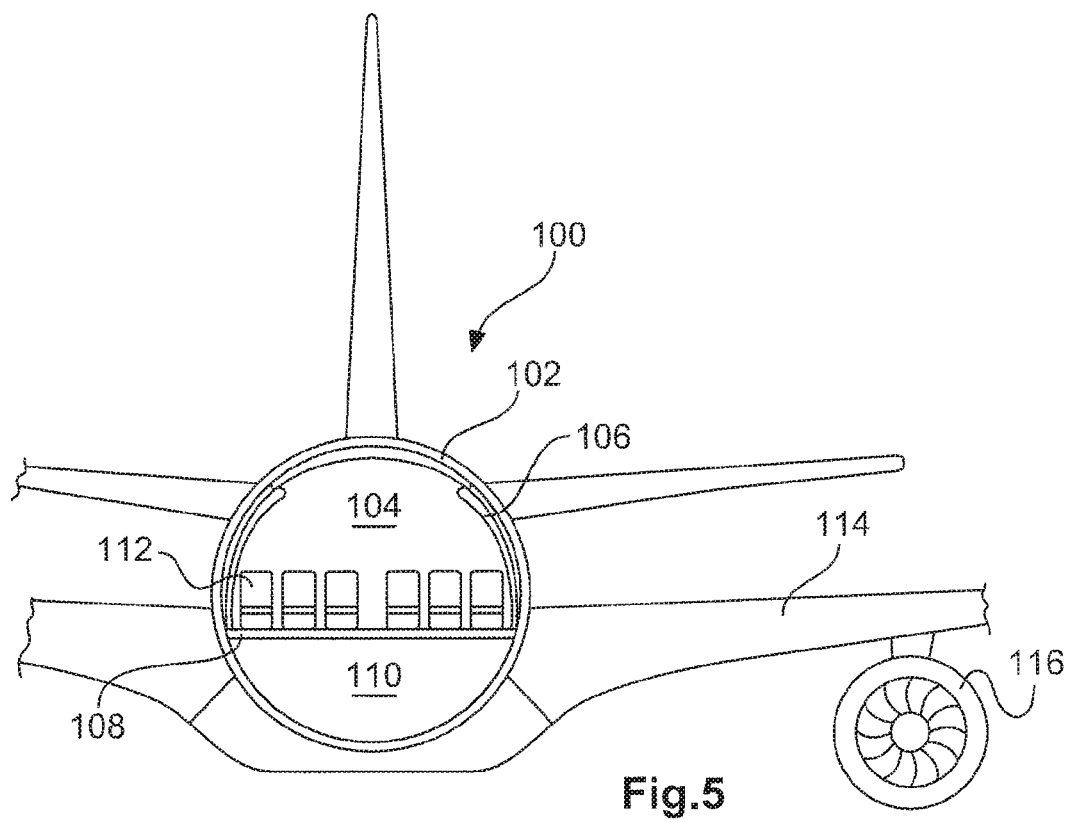
FIG. 5 is an example of an aircraft with a cabin area with acoustical cabin panels as interior trim in a schematic cross-section.

FIG. 5 shows an aircraft 100 in a schematic cross-section. The aircraft 100 comprises a fuselage construction 102 and a cabin section 104 located therein. The cabin section 104 comprises an interior trim 106. To improve the acoustical properties at least a part of the interior trim is formed as acoustical cabin panels in accordance with one of the above mentioned embodiments. In the cabin area, which is separated from a cargo loading area 110 lying underneath for example by means of an intermediate floor construction 108, passenger seats 112 are schematically indicated. It should be noted that further installations, such as luggage compartments above the seats, are not shown as to simplify the drawings. The aircraft 100 is also shown equipped with wing constructions 114 on which engines 116 are arranged, for example. By providing at least a part of the interior trim panels 106 as acoustical cabin panels 10 the comfort of the passengers on board the aircraft is improved in terms of acoustics, for example by at least dampening a sound transmission from the turbines 116 arranged outside into the cabin area 104 through the panels.

Figure 6:
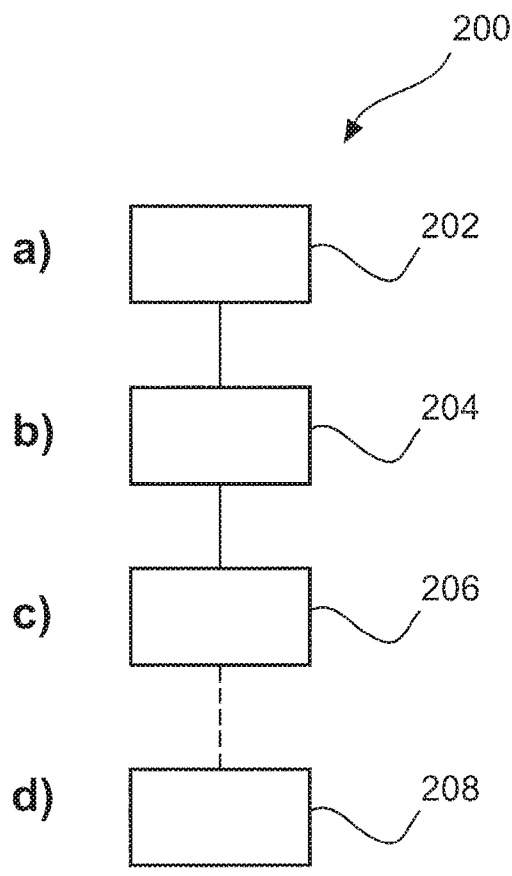
FIG. 6 is an example of a method for manufacturing an acoustical cabin panel.

FIG. 6 shows an example of a method 200 for manufacturing an acoustical cabin panel. The method 200 comprises the following steps:

In a first step 202 an intermediate layer is arranged between a first and a second layer, wherein the first and the second layer are spaced apart from each other through the intermediate layer. The intermediate layer comprises at least one intermediate sublayer made of a core material that is arranged in the intermediate layer. In accordance with the description a prepreg soaked with matrix material is provided in at least one of the first and second layers.

In a second step 204 a plurality of reinforcement elements is arranged which extend from the first to the second layer through the at least one intermediate sublayer and which are tension and pressure resilient in the finished state of the panel.

In a third step 206 at least a part of the reinforcement elements is infiltrated with a curable matrix material. The first layer, the intermediate layer and the second layer and the reinforcement elements altogether form a core composite component.

In FIG. 6 it is also shown as an option that the reinforcement elements can be designed as thread elements wherein further a fourth step 208 is provided, in which the matrix material is cured.

In a further example, the curing is also planned with reinforcement elements which are not provided as thread elements, but as pins or other applications, for example.

The first step 202 is also referred to as step a), the second step 204 as step b), the third step 206 as step c), and the optionally shown fourth step 208 as step d).

Figure 7:
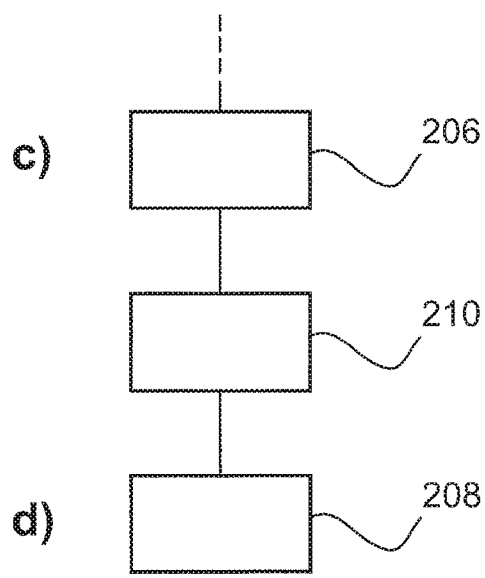
FIG. 7 is another example of a manufacturing method.

In FIG. 7 a further example is shown in which prior to the curing of the matrix material in the fourth step 208 a further step 210 is provided in which a customization to a shape or a contour takes place. For example, the arranging of the reinforcement elements in the second step 204 takes place prior to the shaping of the further step 210.

In FIG. 7 it is shown, for example, that the shaping in the further step 210 takes place after the infiltration in the third step 206.

In a further example it is provided that the shaping takes place before the infiltration of the reinforcement elements.

The examples described above can be combined in different ways. In particular, aspects of the devices can be used for embodiments of the method and use of the devices and vice versa.

Additionally, it is noted that "comprising" does not exclude other elements or steps and "one" or "a" does not exclude a plurality. It should also be noted that features or steps that are described with reference to one of the above embodiments can also be used in combination with other features or steps of other embodiments described above. Reference signs in the claims are not to be construed as limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

The invention claimed is:

1. An acoustical cabin panel, comprising:
    a first and a second layer which are spaced apart from each other by an intermediate layer and altogether with a plurality of reinforcement elements form a core composite component;
    at least one intermediate sublayer made of a core material that is placed in the intermediate layer;
    wherein the reinforcement elements extend from the first to the second layer through the at least one intermediate sublayer and are tension and pressure resilient in a finished state of the panel;
    wherein the reinforcement elements can be at least partially infiltrated with a curable matrix material;
    wherein at least one prepreg soaked with matrix material is provided in the first and/or second layer;
    wherein the reinforcement elements to be infiltrated with matrix material are in connection with the prepreg; and
    wherein the core material is a silicone foam rubber.

2. The acoustical cabin panel according to claim 1, wherein the intermediate sublayer comprises a material which is elastically compressible and has a low rigidity.

3. The acoustical cabin panel according to claim 1, where the reinforcement elements are bend-proof; and
    wherein the reinforcement elements are connected to the first and second layer.

4. The acoustical cabin panel according to claim 1, wherein the reinforcement elements are formed as thread elements; and
    wherein the thread elements are infiltrated with the curable matrix material.

5. The acoustical cabin panel according to claim 1, wherein the reinforcement elements are inclined with respect to a layer direction, $S_R$ and layer thickness, $S_D$.

6. The acoustical cabin panel according to claim 1, wherein the intermediate sublayer is provided with a blocking treatment at least in the area of reinforcement elements, wherein the blocking treatment prevents matrix material from entering when infiltrating the reinforcement elements.

7. The acoustical cabin panel according to claim 1, wherein the first and the second layer are made of fiber-reinforced plastic and/or of metal material.

8. An aircraft comprising at least one cabin section located in a fuselage construction, the cabin section comprising an interior trim having panels;
- wherein at least one of the panels is an acoustical cabin panel, the acoustical cabin panel comprising:
- a first and a second layer which are spaced apart from each other by an intermediate layer and altogether with a plurality of reinforcement elements form a core composite component;
- at least one intermediate sublayer made of a core material that is placed in the intermediate layer;
- wherein the reinforcement elements extend from the first to the second layer through the at least one intermediate sublayer and are tension and pressure resilient in a finished state of the panel;
- wherein the reinforcement elements can be at least partially infiltrated with a curable matrix material;
- wherein at least one prepreg soaked with matrix material is provided in the first and/or second layer;
- wherein the reinforcement elements to be infiltrated with matrix material are in connection with the prepreg; and
- wherein the core material is a silicone foam rubber.

9. A method for manufacturing an acoustical cabin panel, comprising the following steps:
- arranging an intermediate layer between a first and a second layer which are spaced apart by the intermediate layer;
- wherein the intermediate layer comprises at least one intermediate sublayer made of a core material that is arranged in the intermediate layer, wherein the core material is a silicone foam rubber;
- wherein a prepreg soaked with matrix material is provided in at least one of the first and second layer;
- arranging a plurality of reinforcement elements which extend from the first to the second layer through the at least one intermediate sublayer and which are tension and pressure resilient in the finished state of the panel; and
- infiltrating at least a part of the reinforcement elements with a curable matrix material;
- wherein the first layer, the intermediate layer and the second layer, together with the reinforcement elements form a core composite component.

10. The method according to claim 9, wherein the reinforcement elements are formed as thread elements; and wherein the method further comprises:
- curing of the matrix material.

11. The method according to claim 9, wherein prior to the curing of the matrix material provision is made for adjusting to a shape or a contour.

12. The method according to claim 9, where prior to the completed curing of the matrix material provision is made for curing the matrix material partly, so that the matrix material then is in a B-stage condition in which a part of the matrix material is cured and a part is not cured; and
- wherein provision is made for the adjusting to a shape or a contour afterwards.

13. The method according to claim 11, wherein the arranging of the reinforcement elements takes place prior to the shaping.

14. The method according to claim 9, wherein the prepreg soaked with matrix material is provided in one of the first and second layer; and
- wherein a shaping takes place prior to the application of a prepreg soaked with matrix material in the other one of the first and second layer and the prepreg soaked with matrix material is applied afterwards.

* * * * *